Sept. 12, 1950 J. E. GERRY 2,522,032
RESILIENT MOUNTING FOR AIRCRAFT NOSE WHEELS
Filed Aug. 22, 1949
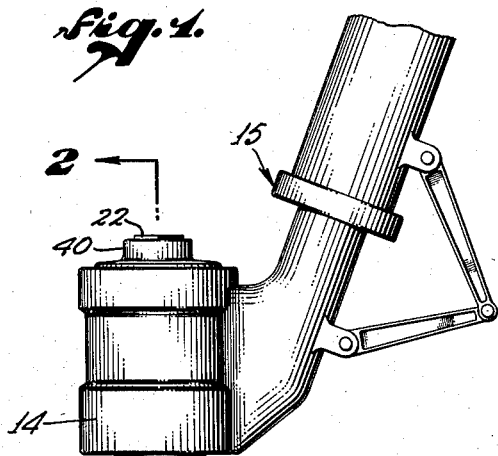
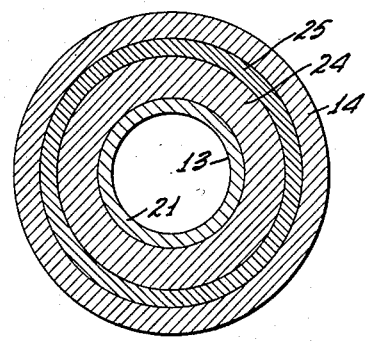
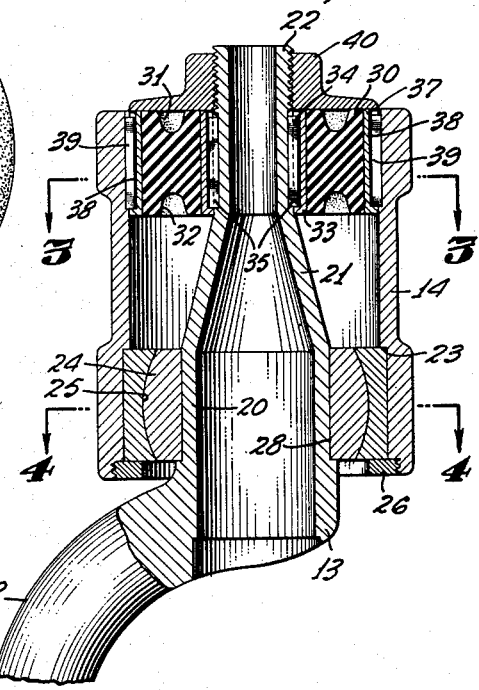
JULIAN E. GERRY,
INVENTOR.
HUEBNER, BEEHLER, WORREL,
HERZIG & CALDWELL,
ATTORNEYS.

Patented Sept. 12, 1950

2,522,032

UNITED STATES PATENT OFFICE 2,522,032

RESILIENT MOUNTING FOR AIRCRAFT NOSE WHEELS

Julian E. Gerry, Burbank, Calif., assignor to Menasco Manufacturing Company, Burbank, Calif., a corporation of California Application August 22, 1949, Serial No. 111,671

7 Claims. (Cl. 244—103)

My invention relates to a flexible coupling and has particular reference to a new and improved mounting for the nose wheel of aircraft.

One of the objects of my invention is to provide a mounting for the spindle shaft of a nose wheel which permits freedom of movement in any direction except vertically under a resilient restraint.

Unless landing conditions are ideal, that is, the runway is relatively smooth and level and wind movement is directly parallel with the line of flight, dynamic loads will be applied to the landing gear upon landing which tend to rotate the spindle shaft of the landing wheel in directions other than parallel of the plane and will also tend to cause tilting of the wheel sideways.

One of the objects of my invention is to provide a nose wheel mounting having sufficient flexibility in any direction, other than vertical, to reduce the dynamic drag loads upon landing and to eliminate "shimmy" by breaking up the rhythmic cycle necessary to produce "shimmy."

It is also a further object of my invention to provide a flexibly mounted nose wheel which aids in steering the airplane on the ground by power or differential breaking due to the permissible torsional deflection and side deflection of the nose wheel.

Other and further objects and advantages of my invention will become apparent from the drawings and the specifications relative thereto.

In the drawings:

Figure 1 is a side elevation of a nose wheel showing the spindle mounting and fragmentary portion of the shock absorber.

Figure 2 is an enlarged sectional elevation taken on line 2—2 of Figure 1.

Figure 3 is a sectional view taken on line 3—3 of Figure 2.

Figure 4 is a sectional view taken on line 4—4 of Figure 2.

Referring to Figure 1, the standard nose wheel mounting comprises a wheel 10 having a shaft 11 and a wheel support 12. The wheel support is secured to a spindle 13 (see Figure 2) mounted in a spindle housing 14. The spindle housing is secured to the lower end of the shock absorber, designated generally 15.

The details heretofore described are more or less standard and constitute no part of my invention. The details of my invention are more clearly illustrated in Figures 2, 3 and 4.

Referring to Figure 2, it will be noted that the spindle 13 is a vertically disposed bearing member having a cylindrical wall 20, a tapered section 21 and a cylindrical wall 22 of lesser diameter than the section 20.

The spindle housing 14 is substantially cylindrical having a shoulder 23 near the lower end thereof. A ball-and-socket joint 24 and 25 is secured adjacent the lower end of the spindle housing 14 and having the socket portion 25 in abutment against the shoulder 23 and secured thereto by means of a lock nut 26. The ball 24 of the ball-and-socket joint is formed with an aperture 28 adapted to receive in frictional engagement the cylindrical section 20 of the spindle 13.

It will thus be seen that in the absence of restraint of the upper end of the spindle 13, the spindle will be free to rotate in any direction, but may not move vertically with respect to the housing 14.

The upper end of the spindle 13 is resiliently restrained from rotation or other movement by means of a resilient securement 30. The resilient securement 30 comprises an annular ring of resilient material, such as rubber, having annular grooves 31 and 32 in the upper and lower surfaces thereof.

A sleeve 33 is secured to the inner surface of the resilient ring 30, which said sleeve 33 is formed with key slots, such as 34, adapted to receive a key 35. It will be understood that the reduced cylindrical portion 32 of the spindle 13 is formed with complementary key slots so that upon assembly there can be no rotation between the section 22 and the sleeve 33. The sleeve 33 is securely bonded to the resilient annular ring 30 by vulcanizing or any suitable standard process.

A second cylindrical sleeve 37 is bonded to the outer periphery of the annular ring 30 and is also formed with a key slot 38 adapted to receive a key 39 to thereby prevent rotation between the resilient ring 30 and the spindle housing 14.

A lock nut or retaining cap 40 is threadedly engaged over the upper end of the spindle to thereby prevent displacement of the resilient ring upwardly, the displacement of the spindle shaft 13 downwardly, and to act as a dust cap to prevent contamination or other harmful substances from entering into the spindle.

Thus, it will be readily seen that I have provided a nose wheel mounting which permits movement of the wheel in any direction, other than vertically. Dynamic loads applied to the wheel, either sideways or fore and aft, permit rotation of the spindle in the ball-and-socket joint within the resilient limits of the resilient ring 30. It will be understood that the depth and contour of the grooves 31 and 32 will be dependent upon the requirements of the particular application, the important feature being that the spindle is free, within the elastic limits of the securement means, for moving in any direction other than vertically.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. A flexible coupling comprising a shaft and a cylindrical housing co-axial with and circumscribing one end of said shaft, said cylindrical housing being provided with means defining a segment of a sphere, said shaft being provided with means defining a complementary segment of a sphere disposed in said first segment for free movement therein, a resilient sleeve having inner and outer surfaces and being of substantial thickness and width secured in non-rotational engagement with said cylindrical housing and said shaft and being formed with a reduced section intermediate the inner and outer surfaces, thereby permitting rotary and lateral movement of said shaft with respect to said cylindrical housing within the torsional and elastic limits of said resilient sleeve.

2. A flexible coupling comprising a shaft and a cylindrical housing co-axial with and circumscribing one end of said shaft, said cylindrical housing being provided with means defining a segment of a sphere, said shaft being provided with means defining a complementary segment of a sphere disposed in said first segment for free movement therein, a resilient sleeve having inner and outer surfaces and being of substantial thickness and width secured in non-rotational engagement with said cylindrical housing and said shaft and being formed with annular grooves intermediate the inner and outer surfaces, thereby permitting rotation and lateral movement of said shaft with respect to said cylindrical housing within the torsional and elastic limits of said resilient sleeve.

3. Means for mounting a wheel to a body to be supported thereby, said means comprising a cylindrical housing associated with said body, a spindle shaft associated with said wheel and having a portion thereof extending into said cylindrical housing, and means for resiliently securing said spindle shaft to said cylindrical housing to permit torsional movement of said spindle shaft and lateral movement of one end of said spindle shaft, said means comprising a ball-and-socket joint in frictional engagement with said cylindrical housing and said spindle shaft and a resilient sleeve having inner and outer surfaces secured in non-rotational engagement with said spindle shaft and said cylindrical housing, said resilient sleeve having material thickness and being formed with a reduced section substantially mid-way between the inner and outer surfaces thereof.

4. Means for mounting a wheel to a body to be supported thereby, said means comprising a cylindrical housing associated with said body, a spindle shaft associated with said wheel and having a portion thereof extending into said cylindrical housing, and means for resiliently securing said spindle shaft to said cylindrical housing to permit torsional movement of said spindle shaft and lateral movement of one end of said spindle shaft, said means comprising a ball-and-socket joint in frictional engagement with said cylindrical housing and said spindle shaft and a resilient sleeve secured in non-rotational engagement with said spindle shaft and said cylindrical housing, said resilient sleeve having an annular recess therein at each end thereof.

5. In combination with the nose wheel landing gear of an airplane, apparatus for resiliently mounting said nose wheel, said apparatus comprising a cylindrical housing having upper and lower edges, an inwardly turned tip at the lower edge thereof defining a peripheral shoulder, a ball-and-socket joint secured in abutting relation against said peripheral shoulder and having a bore concentric therethrough, a spindle shaft disposed through said bore in frictional engagement therewith, means secured to the inner surface of said cylindrical housing adjacent the upper edge thereof adapted to resiliently restrain said spindle shaft from lateral or torsional movement, and a dust cap in threaded engagement with the upper end of said spindle shaft adapted to enclose the upper end of said cylindrical housing.

6. In combination with the landing gear of an airplane having a wheel adapted to contact the ground and support said airplane on the ground, apparatus for resiliently mounting said wheel, said apparatus comprising a cylindrical housing having upper and lower edges and an inwardly turned lip at the lower edge thereof defining a peripheral shoulder, a ball-and-socket joint secured in abutting relation against said peripheral shoulder and having a bore concentric therethrough, a spindle shaft disposed through said bore in frictional engagement therewith, means secured to the inner surface of said cylindrical housing adjacent the upper edge thereof adapted to resiliently restrain said spindle shaft from lateral or torsional movement, said means comprising a resilient sleeve of substantial thickness and width and having an inner and outer peripheral surface disposed within said cylindrical housing in non-rotational engagement with said cylindrical housing and said spindle shaft, said resilient ring being formed with a reduced section substantially mid-way between said inner and outer surfaces to permit radial and/or lateral displacement of said spindle shaft with respect to said cylindrical housing, and a dust cap in threaded engagement with the upper end of said spindle shaft adapted to enclose the upper end of said cylindrical housing.

7. In combination with the nose wheel landing gear of an airplane, apparatus for resiliently mounting said nose wheel, said apparatus comprising a cylindrical housing having upper and lower edges and an inwardly turned lip at the lower edge thereof defining a peripheral shoulder, a ball-and-socket joint secured in abutting relation against said peripheral shoulder and having a bore concentric therethrough, a spindle shaft disposed through said bore in frictional engagement therewith, means secured to the inner surface of said cylindrical housing adjacent the upper edge thereof adapted to resiliently restrain said spindle shaft from lateral or torsional movement, said means comprising a resilient sleeve of substantial thickness secured in non-rotational engagement with said cylindrical housing and said spindle shaft thereby permitting radial and/or lateral displacement of said spindle shaft with respect to said cylindrical housing, and a dust cap in threaded engagement with the upper end of said spindle shaft adapted to enclose the upper end of said cylindrical housing.

JULIAN E. GERRY.

REFERENCES CITED

The following references are of record in the file of this patent:

UNITED STATES PATENTS

| Number | Name | Date |
|---|---|---|
| 1,591,638 | McCauley et al. | July 6, 1926 |
| 1,770,756 | Markey | July 15, 1930 |
| 2,254,325 | Slack et al. | Sept. 2, 1941 |
| 2,267,312 | Smith | Dec. 23, 1941 |
| 2,342,577 | Gehman | Feb. 22, 1944 |
| 2,480,697 | Bigelow | Aug. 30, 1949 |
| 2,490,560 | Urquhart | Dec. 10, 1949 |

FOREIGN PATENTS

| Number | Country | Date |
|---|---|---|
| 261,831 | Italy | Dec. 19, 1928 |